June 10, 1924.
G. E. PAGE
1,497,633
METHOD OF MAKING SHEET METAL VESSELS
Filed April 18, 1921    4 Sheets-Sheet 1
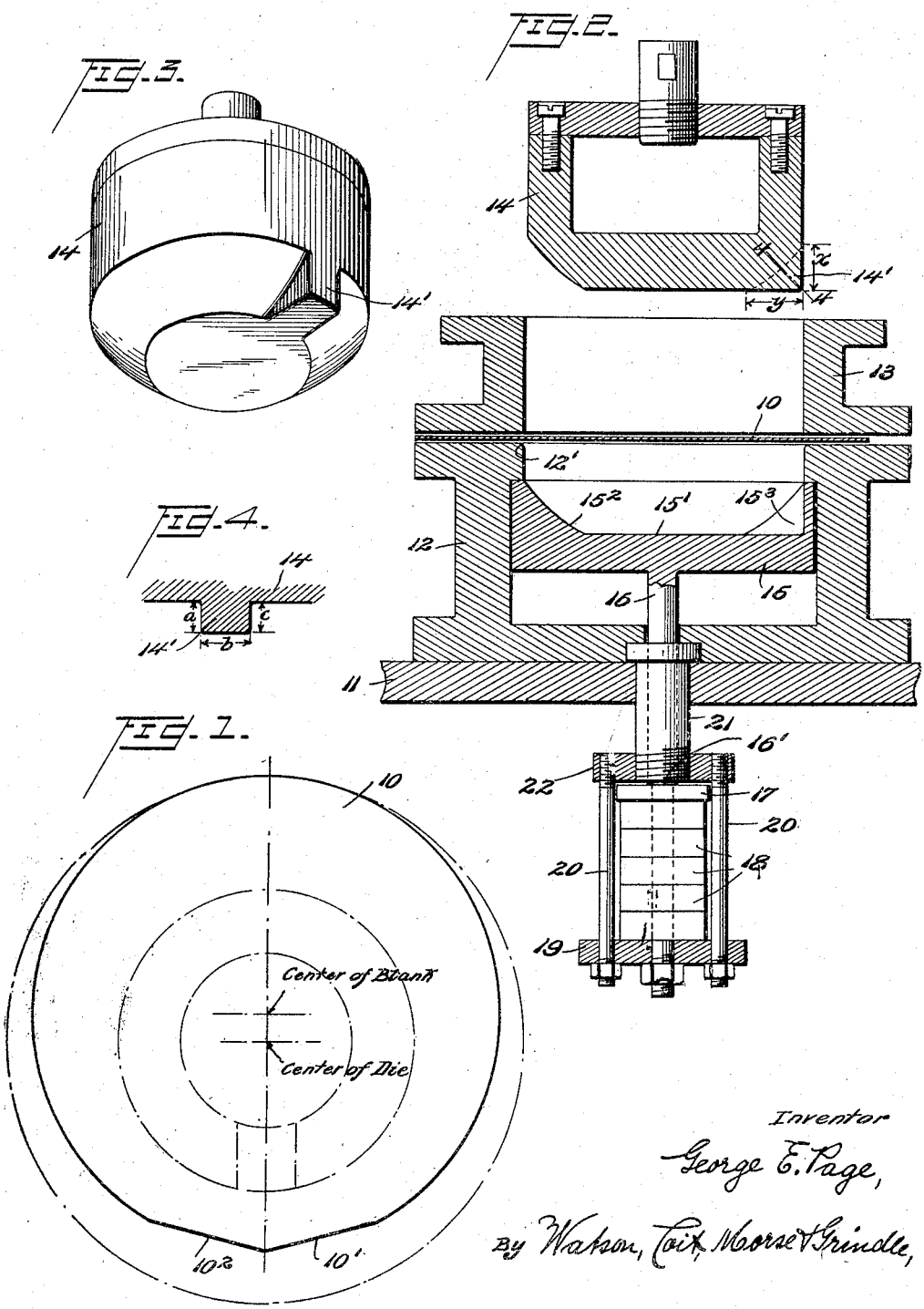

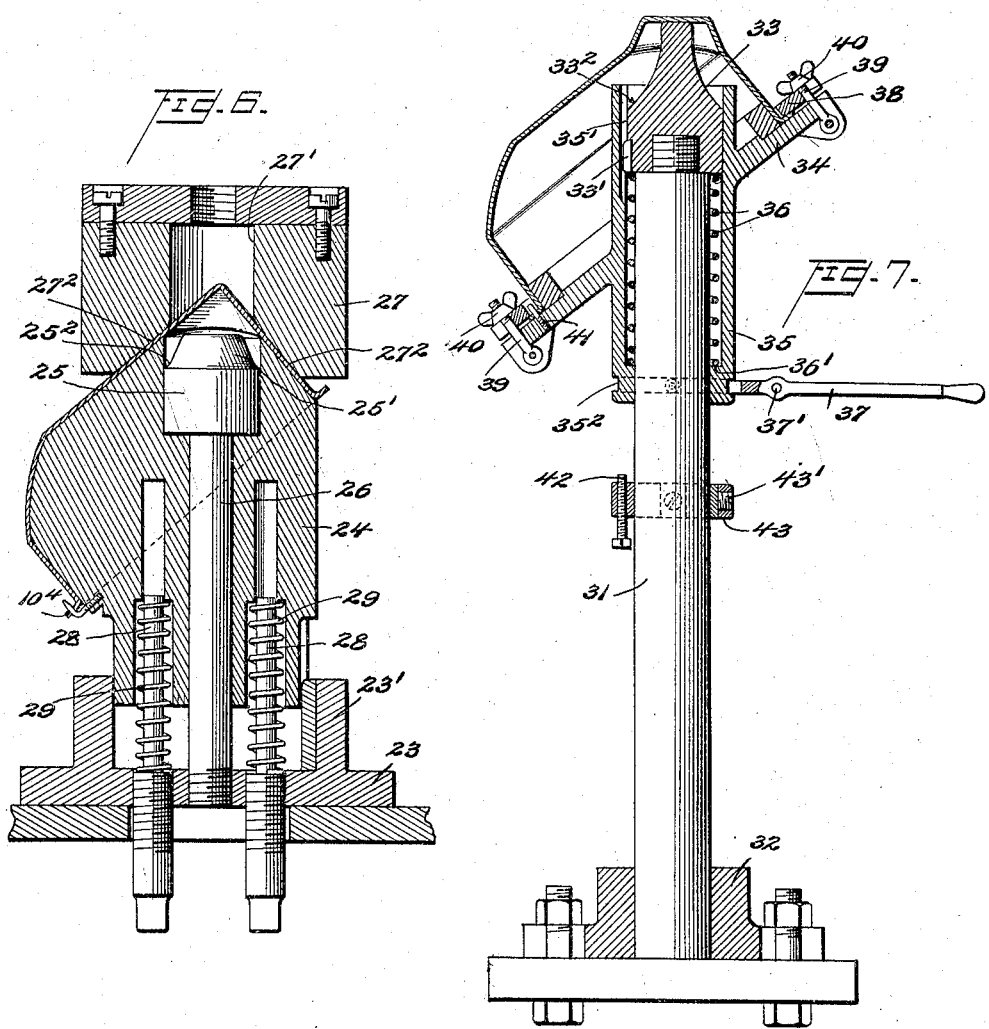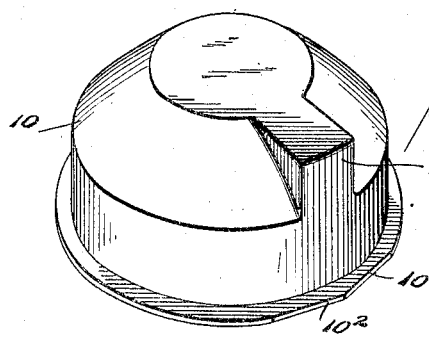

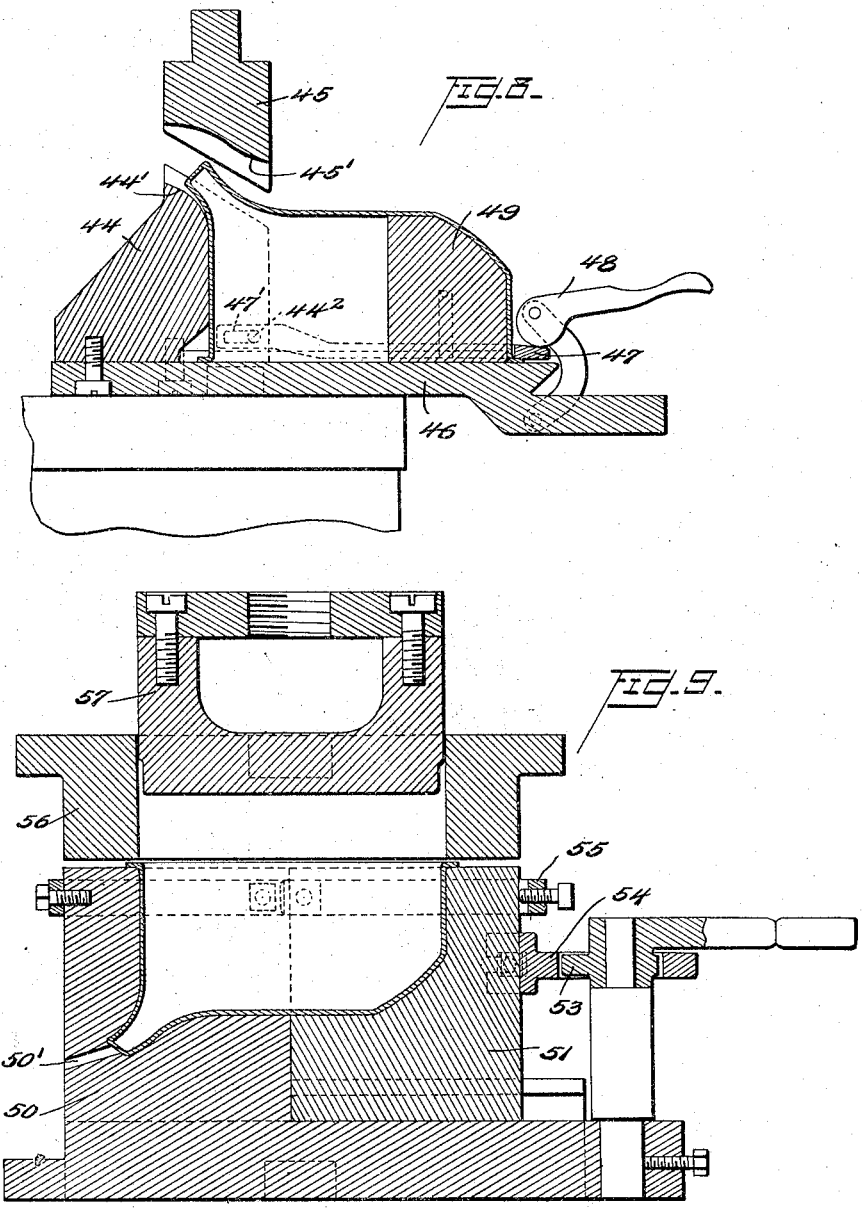

June 10, 1924.  G. E. PAGE  1,497,633
METHOD OF MAKING SHEET METAL VESSELS
Filed April 18, 1921   4 Sheets-Sheet 4

Inventor
George E. Page,
By Watson, Coit, Morse & Grindle,
Attys

Patented June 10, 1924.

1,497,633

UNITED STATES PATENT OFFICE.

GEORGE E. PAGE, OF ROCHESTER, NEW YORK, ASSIGNOR TO MONTOUR ALUMINUM SOLDERING CORPORATION, OF MONTOUR FALLS, NEW YORK, A CORPORATION OF NEW YORK.

METHOD OF MAKING SHEET-METAL VESSELS.

Application filed April 18, 1921. Serial No. 462,214.

*To all whom it may concern:*

Be it known that I, GEORGE E. PAGE, a citizen of the United States, and residing at Rochester, Monroe County, State of New York, have invented certain new and useful Improvements in Methods of Making Sheet-Metal Vessels, of which the following is a specification.

The present invention relates to metal working and more particularly to a method of making containers with integral tubular spouts.

Heretofore in the manufacture of vessels with tubular spouts, such as kettles from sheet metal, the spouts and bodies of the kettles have been made separately and thereafter the spouts secured to the bodies in any suitable way as by welding or soldering. Kettles made in this manner have not been entirely satisfactory because the joint between the spout and body of the kettle is weak. Furthermore in joining the spout to the body more or less of a ridge is formed in the interior of the kettle which affords a lodgment for foreign matter, thus rendering the kettle more or less unsanitary. Kettles which have spouts soldered thereto are more objectionable than the ones having welded spouts as the solder will melt if subjected to great heat.

Kettles have also been cast, but obviously such kettles are more expensive than the ones manufactured from sheet metals, as the walls are thicker in order to obtain satisfactory castings.

The aim of the present invention is to eliminate the above mentioned defects and to this end consists in the method of manufacturing containers such as kettles by forming the tubular spouts integral with the body of the container.

The method of the present invention consists in operating on a blank of sheet metal to form the body of the container, and also forming an integral tubular spout thereon.

The method will be described in connection with the at present preferred apparatus for carrying out the same, it being understood that the invention is not limited to the particular apparatus described. Referring to the drawings;

Fig. 1 is a plan view of the sheet metal blank from which the walls, top and spout of the kettle are formed; the dotted lines indicating the outline of the die illustrated in Figure 2 and on which the blank is placed for the first operation;

Fig. 2 is a longitudinal sectional view through a portion of a sheet metal press showing a plunger and a plain drawing die or "push through" die, for accomplishing the first step of the method;

Fig. 3 is a bottom perspective view of the plunger illustrated in Figure 2;

Fig. 4 is a section on line 4—4 of Figure 2;

Fig. 5 is a perspective view of the partially completed work as it appears after the completion of the first step of the method;

Fig. 6 is a sectional elevation of a portion of a special forming press for accomplishing the second step of the method;

Fig. 7 is a longitudinal sectional view of a spinning device for performing the third step of the method;

Fig. 8 is a sectional elevation of a portion of a press for performing the fourth step or operation;

Fig. 9 is a sectional elevation of a portion of a press for performing the fifth step of the method.

Figure 10:
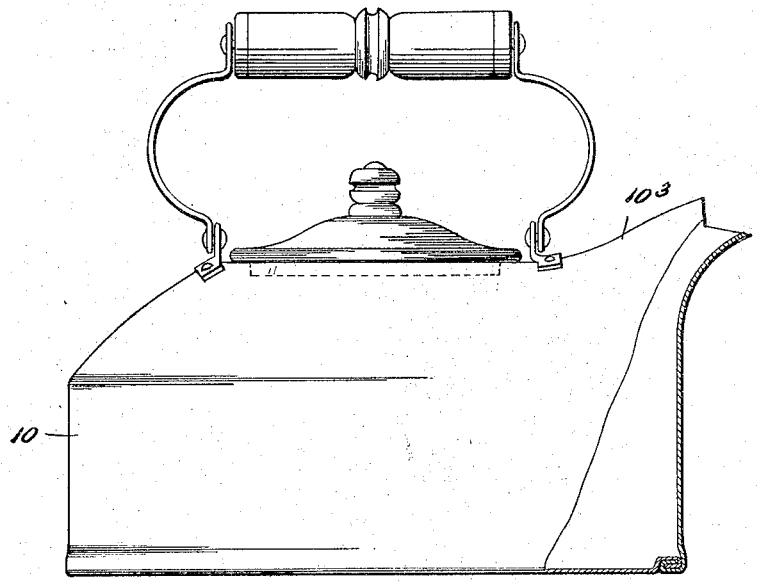
Fig. 10 is a side view, partially broken away, of the finished product.

The sheet metal used is preferably aluminum, which may be conveniently worked by the improved method, and is a desirable metal for the finished product, but it will be understood that any other suitable sheet metal may be used and that the size of the vessel and the sizes of the drawing dies and other apparatus may be varied as desired, the drawings illustrating apparatus which has been successfully used in fabricating a kettle such as illustrated in Figure 10 having a diameter of 10 inches and a height from the bottom edge to the top of the body of approximately $4\frac{1}{2}$ inches. The sheet metal used in this particular instance was No. 18 gauge.

As a preliminary step a circular blank or disk 10 is stamped from sheet aluminum, this blank having a diameter of approximately $17\frac{1}{4}$ inches, and being preferably formed with two straight edges 10' and 10² meeting at a point on the circumference of the blank, these straight edges being chords of the circumference of the disk and having equal lengths of approximately 4⅜ inches.

Briefly stated the steps of the method consist in first, operating on a sheet metal blank to form a shell having a nose such as indicated at 10³ in Figure 5. Second, operating on the shell to change the shape of the nose into a projection substantially circular in cross section. Third, operating on the shell to elongate the projection. Fourth, operating on the shell to curve the projection or spout longitudinally. Fifth, placing the shell within a mold and subjecting the interior of the shell to fluid pressure so that the shell will take on the shape of the mold. Sixth, cutting the end of the spout, perforating the top of the shell for the filling opening, and attaching the bottom and the handle. These steps will now be described more in detail.

*First operation.*—The blank above described is, for the first operation, placed in the press illustrated in Figures 2, 3 and 4. This press has a base 11, a stationary die 12 supported on the base, a blank holder 13, a plunger 14, and a movable die 15 contained within the stationary die 12 and vertically reciprocable relatively thereto. A column 16 supports the movable die 15 and extends downwardly through the bottom of the stationary die 12 and through a washer 17, a downwardly facing annular shoulder of the column resting upon the upper face of this washer. The washer rests upon the uppermost of a series of annular rubber members 18 forming a rubber spring barrel or pressure attachment. The lowermost rubber washer 18 is supported on a disk 19 hung from base 11 by bolts 20, tubular member 21 surrounding the post 16, and an annular member 22 having threaded engagement with and connecting tube 21 and the upper ends of the bolts 20. Downward movement of the die 15 is, therefore, opposed by the rubber spring barrel with a force which increases as the movable die descends. The interior walls of the blank holder and of the female die 12 are cylindrical and each has a diameter of approximately 9.95 inches. The central portion 15′ of the die 15 is circular and flat and is concentric with the axis of the press and the drawing surface of stationary die 12. The diameter of the circular flat portion is about 5¾ inches. Surrounding the central circular portion 15′ of die 15 is an inclined portion 15² which is preferably spherical, having a curved cross section with a radius of approximately 6 13/64 inches, as illustrated in Figure 2, except at 15³ where a recess is formed the bottom of which is a continuation of the flat surface 15′ and the outer wall of which is a continuation of the cylindrical drawing surface of die 12. The sides of this recess are preferably substantially parallel and the projecting portion 14′ of the plunger illustrated in Figure 3 is preferably of the same shape as the recess 15³, though being of course, slightly smaller, this projection 14′ being adapted to cooperate with the recess 15³ in the formation of a protuberance or nose on the blank in the first drawing operation. The exact shapes of the nose and recess may be modified however in various ways, for instance the nose 14′ may be narrower than the recess, with the result that the side walls of the nose of the shell will be inclined somewhat. Or the side walls of nose 14′ and recess 15³ might be inclined if desired.

The blank 10 is placed in position on the die 12, as shown in Figures 1 and 2, with the center of the blank eccentrically arranged relatively to the die, a distance of approximately 1⅛ inches for the particular vessel being described, and the blank is turned so that the intersection of edges 10′ and 10² lies in a plane passing through the axis of the press and the center of the recess 15³. With the blank in this position pressure is exerted on the blank holder in a well known manner to maintain the edges of the blank under pressure during the drawing operation, and the plunger 14 is caused to descend. The descending plunger carries the center of the blank downwardly past the suitably rounded upper edge 12′ of the die 12 and drawing additional metal from between the top of the die 12 and blank holder 13. The projection 14′ tends immediately to form a bulge or protuberance on the blank, which is otherwise symmetrical, and it is desirable that metal be drawn more rapidly on this side between the blank holder and die than at other points around the blank, and this more ready flow of metal is obtained by positioning the blank in the manner described, that is by positioning the blank eccentrically, so that the blank holder has less bearing surface on the blank adjacent the protuberance than at other points. The flow of metal is further facilitated by the peculiar shape of the edge of the blank adjacent the protuberance being formed. The straight edges 10′ and 10² decrease the tendency on this side of the blank to oppose the drawing action of the plunger.

When the plunger has descended below the cylindrical drawing surface of die 12, it meets the movable die 15 which opposes further movement of the plunger with a gradually increasing force. The projection 14′ gradually enters the recess 15³ and, when the plunger 14 and die 15 have completed their downward movement a cup shaped shell has been formed having a nose or protuberance corresponding in shape to the recess 15³ and the projection 14′. The work now resembles the cup or shell illustrated in Figure 5 and is ready, when withdrawn from the press, for the second operation.

The projection 14′ of the plunger is preferably designed so that the dimension $x+y$ (Figure 2) is equal to the dimension $a+b+c$ (Figure 4) and, for the particular article described these dimensions are each 4.221 inches. If this requirement as to dimension is not followed the projection 14′ will tend to tear or rupture the metal of the blank in forming the nose or protuberance. The shape illustrated, and having the dimensions specified, I have found satisfactory in operation, and to draw the metal into the protuberance from the surrounding portion of the blank without tearing. Neither is it subjected to strains that might render it weak for the subsequent operation.

In general, it might be stated that the length of the nose $(x+y)$ should be substantially equal to the distance across the bridge thereof $(a+b+c)$. If this rule is followed the metal will be drawn the same amount in both directions and will therefore be equally strong in both directions.

*Second operation.*—The apparatus for performing the second operation is illustrated in Figure 6 and comprises a base 23 formed with an upwardly directed annular flange 23′ to receive with a sliding fit the cylindrical lower end of a work holder 24, a plunger 25 rigidly supported upon the base by a post or column 26 and a die 27 which is vertically movable by any suitable means. The work holder 24 is guided in its vertical movements by the flange 23′ and by rods 28, and is normally held in its uppermost position by springs 29, so that the plunger is contained within a cylindrical recess in the upper end thereof provided for its reception, and will not interfere with the placing or removal of the work. The die 27 has a central cylindrical aperture 27′ and has inclined faces $27^2$ which fit down on the work to hold it firmly in the drawing operation, the faces $27^2$ conforming to the shape of the work, having a flat portion fitting against the flat portion of the work, a spherical portion fitting against the spherical portion of the work and a cylindrical portion.

The plunger 25 is provided with a drawing surface 25′ which is substantially in the form of the frustrum of a cone but curved in longitudinal section, as shown in Figure 6, the radius of the curve $25^2$ adjacent the junction point of the conical section and the cylindrical section being that selected for the radius of the curve between the base of the spout and the surface of the body of the vessel as shown in the finished product. This radius for the particular vessel being considered is about 3 1/34 inches and the height of the conical portion of the plunger 1⅜ inches, the surface area of the conical portion of the plunger, including its flat upper surface, being substantially equal to the area of the surface of the nose or protuberance 10′ of the shell formed in the first operation.

For the purpose of accurately positioning the work, the flange of the cup or shell is perforated at $10^4$, between the first and second operations, and a hook secured to the work holder 24 extends upwardly through this slot or perforation when the shell is properly positioned on the work holder. This insures that the axis of the plunger 25 is alined with the axis of the protuberance $10^3$.

With the parts in the position illustrated in Figure 6 a downward pressure is exerted on the die 27 which descends, pushing the work and the work holder downwardly relative to the plunger 25, and this motion is continued against the resistance of springs 29 until the protuberance has been changed in shape from the angular shape illustrated in Figure 5 to the frustro conical shape illustrated in Figure 7, after which the pressure on the die 27 is removed and the die raised allowing the work holder to move upwardly, and the work to be removed for the next operation.

*Third operation.*—For performing the third operation the shell is placed upon the spinning device illustrated in Figure 7. This device comprises a shaft 31 supported by a base member 32 which is secured to the revoluble face plate of a lathe or similar device and which has fixed on its upper end a spindle or mandrel 33 of a shape substantially corresponding to the desired shape of the spout of the finished article. The shell is mounted upon the inclined work holding platform 34 which is secured to or integral with a sleeve 35 fitting around shaft 31 and longitudinally movable relative thereto. This sleeve is provided interiorly at one end with a vertical slot 35′ to receive a lug or key 33′ on the mandrel 33 so that the mandrel and sleeve are constrained to rotate together. Between an end of the arbor and the interior annular shoulder 16′ of the sleeve is positioned a spring 36 which is normally compressed and tends constantly to force the sleeve downwardly relative to the arbor, thereby keeping the point of the arbor in contact with the work. Near its lower end sleeve 35 is formed with an annular groove $35^2$ and the prongs of a forked lever 37, which is pivoted at 37′, extend into this groove. By means of the lever the operator may effect longitudinal movement of the work support 34 at will while the work is rotating. The means for securing the work to the work holding platform comprises a ring 38, which clamps the flange of the shell to the holder by means of a number of pivoted bolts 39 having wing nuts 40 which hold the ring in position. A pin 41 extends through the aperture in the flange of the shell and accurately positions the work with the axis of the protuberance alined with the axis of the arbor 33.

To form the tubular nose or protuberance the operator manipulates the handle 37 and the usual hand spinning tool while the work is rapidly rotating, and spins the same in the well known manner until it lies against the curved surface of the arbor. The longitudinal motion of the work relative to the arbor is continued until the inner end of the sleeve 35 contacts with the screw 42 in a collar 43 longitudinally adjustable on the shaft 31 and having set screw 43' to secure it in adjusted position. The position of collar 43 and adjustment of screw 42 conform to the particular work being performed. The arbor at 33' has the same curvature as the corresponding part of the shell and the portion 25² of die 25 in the previous operation. Hence the spinning tool need not travel so close to the body of the shell as to mark it in any way.

*Fourth operation.*—After the nose or shoulder protuberance has been spun in the manner described it appears as illustrated in Figure 8, and the next step is to curve it longitudinally into the shape desired. To this end it is clamped in a press which is partially illustrated in Figure 8, the cylindrical portion of the body adjacent the spout fitting closely against the corresponding cylyndrical surface of a shaping member or die 44 with the nose extending laterally over a curved surface 44' and a plunger 45 is moved downwardly to engage the upper side of the nose, this plunger having a groove 45' of the desired shape in its bottom, and a sufficient pressure being exerted to bend the nose into the desired curved form. During this bending operation the shell is held against movement by clamping its flange to the base 46 by means of the U-shaped clamping member 47 and a hand operated cam member 48. To prevent the metal at the rear of the shell from being pulled forward during the bending operation and injuring the symmetry of the vessel a form 49 is provided which fits closely against the portion of the interior surface of the vessel opposite the spout and prevents such movement, this form being secured to base 46, in any suitable manner. The ends of the U-shaped clamping member 47 have pin and slot connections with the part 44 as indicated at 47' and 44² in order that the member may be moved to the right as viewed in Figure 8, to permit the positioning of the shell in the device.

*Fifth operation.*—After the nose has been curved in the manner just described the shell is placed in a form or die as illustrated in Figure 9, this die being formed in two portions, a stationary portion 50 and a movable portion 51, and being hollowed out to provide a recess corresponding exactly to the desired contour or shape of the finished kettle. The die is formed in two portions so that the shell may be readily inserted by sliding the movable portion away from the fixed portion. When the shell has been inserted the two parts of the die are forced together by means of a manually operable cam 53 acting on a lug 54 secured to the movable member 51. A safety clamp 55 is then placed around the top of the die. A cylindrical member 56 resembling a blank holder in structure and operation is placed in position and the shell and interior of member 56 filled with a suitable fluid. A piston 57 is then moved downwardly through the member 56 and a sufficient pressure exerted on the fluid to flatten out by fluid pressure, and dents which may have been made in the work at any time. The pressure is preferably increased until fluid breaks through the end of the nose and escapes through outlet 50'. If desired the shape of the recess may be modified so as to obtain vessels having other than the smooth exterior surface of the form illustrated herein. Thus with a proper recess the smooth shell shown might be formed into what is termed the colonial design, that is a design with a plurality of adjacent flat faces. Heretofore the colonial design has been obtained only in cast kettles and is very expensive. If desired, this step of subjecting the interior of the kettle to fluid pressure may be omitted as a carefully manufactured kettle can be had with a substantially smooth and unmarred exterior surface.

When this operation is completed it remains only to remove the shell from the die, cut the end of the spout into the shape shown in Figure 10, attach the bottom in any well known manner, make the aperture in the top for filling the vessel, and attach a handle thereto. The resulting product is strong, sanitary and attractive in appearance and the method of manufacture above described effects a considerable saving in cost.

While I have described in detail the exact process which I have discovered to be satisfactory in accomplishing the desired result and have stated a number of dimensions in order that one skilled in the art may reproduce the article without experimenting, it will be understood that the invention is not limited to the dimensions given and that vessels of different sizes and shapes may have tubular spouts of protuberances formed thereon by the present method and also that the present invention includes modifications and changes which come within the scope of the appended claims.

Having thus described the invention what is claimed as new and desired to be secured by Letters Patent is:

1. In the method of making a vessel having an integral spout, the steps of forming a cup-shaped member having a nose, shaping the nose containing substantially all the metal necessary for the formation of the completed spout into a tubular protuberance closed at its outer end, curving said protuberance longitudinally and thereafter removing the end closure.

2. The method of making a vessel comprising, forming a shell consisting of a cylindrical wall, a circular wall perpendicular to said cylindrical wall and an inclined wall joining said cylindrical and circular walls; pressing out a nose from said inclined wall, said nose comprising two intersecting walls, one being an extension of said circular wall and the other of said cylindrical wall and two spaced walls each joining the other two walls of the nose, and the said inclined wall, and forming said nose into a tubular projection to constitute a spout.

3. The method of making a vessel having an integral spout consisting in forming a cup-shaped member having a side wall inclined to the bottom of the vessel, pressing out a nose from said inclined wall, containing substantially all the metal necessary for the formation of the completed spout, and shaping said nose into a tubular spout.

4. The method of making a vessel consisting in the steps of operating on a sheet of metal to form a cup-shaped member having a nose containing substantially all the metal necessary for the formation of the completed spout, and shaping the nose into a tubular spout.

5. The method of making a vessel consisting in the steps of operating on a disc to form a cup-shaped member having a nose containing substantially all the metal necessary for the formation of the completed spout, and shaping the nose into a tubular spout.

6. The method of making a vessel having an integral spout consisting in drawing a sheet of metal into a cup-shaped member having a nose containing substantially all the metal necessary for the formation of the completed spout, and forming the nose into a tubular projection.

7. The method of making a vessel having a tubular spout consisting in drawing a sheet of metal into a cup-shaped member having a nose containing substantially all the metal necessary for the formation of the completed spout and forming the nose into a curved projection.

8. The method of making a vessel having a tubular spout consisting in operating on a sheet of metal to form a cup-shaped member having a nose containing substantially all the metal necessary for the formation of the completed spout, forming the nose into a tubular projection and elongating said projection by spinning.

9. The method of making a vessel having a tubular spout consisting in operating on a sheet of metal to form a cup-shaped member having a nose containing substantially all the metal necessary for the formation of the completed spout, forming the nose into a tubular projection and elongating said projection by spinning and curving said projection longitudinally.

10. The method of forming a cup-shaped shell having a projecting nose consisting in placing the blank eccentrically across a female die, clamping the edges of the blank, and drawing the central portion of the blank through the die by means of a plunger, the plunger having a nose adjacent the edge of the blank which is nearest the center of the die.

11. The method of making a vessel comprising, forming a shell having two walls substantially perpendicular to each other, said walls being connected by an inclined wall, pressing out a nose from said inclined wall containing substantially all the metal necessary for the formation of the completed spout, and shaping said nose into a spout.

12. The method of making a vessel comprising, forming a shell having two walls substantially perpendicular to each other, said walls being connected by an inclined wall, pressing out a nose from said inclined wall, said nose comprising two intersecting walls, each being an extension of one of said perpendicularly disposed walls, and two spaced walls each joining the other two walls of the nose, and the said inclined wall, and forming said nose into a spout.

13. A blank for a sheet metal article comprising a plate of sheet metal in the form of a disc having a segment removed whereby metal may flow more freely toward the center of the disc from the chord of the segment, than from the curved periphery of the disc, in a drawing operation.

14. A blank for a sheet metal article comprising a plate of sheet metal in the form of a disc having a plurality of segmental pieces removed whereby metal may flow more freely toward the center of the disc from the chord of the segment, than from the curved periphery of the disc, in a drawing operation.

15. A blank for a sheet metal article comprising a plate of sheet metal in the form of a disc having two segmental pieces removed, the chords of said segments meeting in a point on the circumference of the circular outline of the disc whereby the metal may flow more freely toward the center of the disc from the chord of the segment, than from the curved periphery of the disc, in a drawing operation.

16. The method of making a vessel having a tubular spout consisting in operating on a sheet of metal to form a cup-shaped member having a nose containing substantially all the metal necessary for the formation of the completed spout, forming said nose into frustro-conical shape, and then elongating the nose into a tubular projection and removing the end portion.

17. The method of making a vessel having a tubular spout consisting in operating on a sheet of metal to form a cup-shaped member having a nose, containing substantially all the metal necessary for the formation of the completed spout, drawing said nose into substantially frustro-conical shape and then elongating the nose into a tubular projection, and removing the end portion.

18. The method of making a vessel having a tubular spout consisting in operating on a sheet of metal to form a cup-shaped member having a nose containing substantially all the metal necessary for the formation of the completed spout, drawing said nose into substantially frustro-conical shape and then spinning the nose into a tubular projection, and removing the end portion.

19. The method of making a vessel, consisting in the steps of operating on a sheet of metal to form a cup-shaped member having a nose containing substantially all the metal necessary for the formation of the completed spout, shaping the nose into a tubular spout and exerting a sufficient fluid pressure within the cup-shaped member to press out dents in the metal and to rupture the end of the spout.

20. The method of manufacturing kettles with integral spouts, which includes as a step, the forming of a shell having a nose, by drawing a substantially circular blank eccentrically, and forming the nose on the side of the shell nearest the edge of the blank.

21. The method of making a vessel comprising, forming a shell having two walls perpendicular to each other and an inclined wall joining the two first mentioned walls, pressing out a nose from said inclined wall, said nose comprising two walls which are continuations of the perpendicularly arranged walls and which intersect in a line or bridge, and two spaced walls each joining the other two walls of the nose and the inclined wall, the proportions being such that the length of the bridge plus twice the shortest distance from one end of the bridge to the inclined wall is substantially equal to the distance between the perpendicularly arranged walls measured over the bridge and perpendicularly thereto, and forming said nose into a tubular projection to constitute a spout.

22. The method of making a vessel comprising, forming a shell having two walls perpendicular to each other and an inclined wall joining the two first mentioned walls, pressing out a nose from said inclined wall, said nose comprising two walls which are continuations of the perpendicularly arranged walls and which intersect in a line or bridge, and two spaced walls each joining the other two walls of the nose and the inclined wall, the proportions of the nose being such that the line of intersection of the surface of the nose with a plane at right angles to the bridge is substantially equal to the line of intersection of the surface of the nose with a plane through the bridge and substantially at right angles to the inclined wall of the shell, and forming said nose into a tubular projection to constitute a spout.

In testimony whereof I affix my signature.

GEORGE E. PAGE.